United States Patent [19]
Giordano

[11] Patent Number: 5,890,299
[45] Date of Patent: Apr. 6, 1999

[54] VIEW ANGLE CORRECTION FOR ACCURATE COLOR ON LIQUID CRYSTAL DISPLAYS

[75] Inventor: Francis Peter Giordano, Scarsdale, N.Y.

[73] Assignee: International Business Machines Corporation, Armonk, N.Y.

[21] Appl. No.: 928,325

[22] Filed: Sep. 12, 1997

[51] Int. Cl.⁶ .................................................. G01C 15/00
[52] U.S. Cl. ............................................... 33/286; 33/263
[58] Field of Search .............................. 33/263, 264, 265, 33/266, 286, 533, 645; 349/58; 361/681

[56] References Cited

U.S. PATENT DOCUMENTS

| | | | |
|---|---|---|---|
| 3,019,022 | 1/1962 | Ehmke | 33/263 |
| 3,906,460 | 9/1975 | Sosa | 33/286 |
| 4,747,672 | 5/1988 | Yasuhara et al. | 348/58 |
| 4,893,141 | 1/1990 | Smart | 33/266 |
| 5,052,112 | 10/1991 | MacDonald | 33/263 |
| 5,113,588 | 5/1992 | Walston | 33/264 |
| 5,260,885 | 11/1993 | Ma | 361/681 |
| 5,815,225 | 9/1998 | Nelson | 349/58 |

FOREIGN PATENT DOCUMENTS

| | | | |
|---|---|---|---|
| 372014 | 9/1920 | Germany | 33/286 |

*Primary Examiner*—G. Bradley Bennett
*Attorney, Agent, or Firm*—Whitham, Curtis, Whitham; Stephen C. Kaufman

[57] ABSTRACT

A visual display with an alignment structure for visually determining a correct display angle and lateral displacement, top to bottom and left to right, for accurate color viewing. A first fixed pattern is located on a surface near a border of the display and a spacer supports a plate, elevated above the first pattern, having a second pattern around a throughole in the plate. The dimensions of the first and second patterns, the elevation of the second, and the throughole diameter are such that when viewed at the intended display angle the image of the first pattern is concentric with the image of second pattern. Alternatively, the spacer may be formed of a transparent member with the second pattern on a planar surface above and parallel to the first fixed pattern. A first and a second alignment structure may be located symmetrically about either side of the display to enable determination of lateral alignment as well as angle of the display.

8 Claims, 2 Drawing Sheets

VIEW ANGLE CORRECTION FOR ACCURATE COLOR ON LIQUID CRYSTAL DISPLAYS

FIELD OF THE INVENTION

This invention generally relates to the field of human interface display screens and, more particularly, to a view angle monitoring and correction apparatus for angle-sensitive liquid crystal displays.

DESCRIPTION OF THE RELATED ART

There is a migration toward portable and, hence, smaller size and lighter structure, computers and multi-media information and entertainment devices. Such devices generally require a visual display. There is also an increasing requirement for finer resolution and improved clarity of the devices' display screens. Based on the present technology of visual displays, the portability requirement generally dictates a liquid crystal display (LCD) as the screen of choice. There is a particular shortcoming, though, with existing LCD, which is that LCD's exhibit a wide range of color and contrast differences depending on their viewing angle. The viewer will see an accurate color only when his or her line of sight is both normal to (meaning perpendicular to) and centered on the LCD face. For color sensitive applications such as, for example, digital image libraries and retail customer interface, accurate color representation is critical. It is also highly desirable from an ergonomic and buyers' preference point of view.

This viewing angle related color sensitivity presents a problem as there is no current means known to the inventor of knowing when this position is attained other than adjusting the screen angle and alignment until the viewer sees what he or she perceives is the correct picture. There are difficulties with this kind of unguided adjustment. One is that it frequently entails a trial-and-error manipulation of the device until the user decides that the image has its best quality. However, this manipulation may take an excessive time because the user cannot easily determine from merely looking at the screen in which direction it should be moved to improve the image. Further, the user may not be able to determine that an image is its "best" point until after he or she has hunted around with the display angle and alignment. This can, of course, be frustrating. Another problem is that the user, especially when looking at a display for the first time, may not know what specific quality or color the image is supposed to have. This problem is further compounded by the trial and error problem identified above.

SUMMARY OF THE INVENTION

An object of the present invention is to provide an economical means for the user to quickly and accurately adjust the display angle, top to bottom and left to right, to attain the correct viewing angle for accurate color viewing.

More particularly, the present invention provides an omni-directional alignment structure mounted on, for example, or imbedded into, the LCD panel's surrounding or border.

One embodiment of the present omni-directional alignment structure comprises a first pattern having a first diameter arranged around an alignment axis on a first surface, a spacer for supporting a second surface at an elevation distance above and extending parallel to the first surface, the second surface having a through-hole centered on the alignment axis with a second diameter, with a second pattern having a third diameter arranged on the second surface and centered on the alignment axis. The elevation distance, the first diameter of the first pattern, the second diameter of the through hole and the third diameter of the second pattern are such that, when viewed from a point on the alignment axis, the image of the second pattern surrounds and is concentric with the image of first pattern.

Another embodiment of the present invention has a first pattern formed on a first planar surface of an optically transparent member, and a second pattern formed on a second planar surface of the optically transparent member. The second planar surface is formed parallel to the first planar surface and spaced apart from the first planar surface by an elevation distance. The first and second patterns are arranged symmetrically about a common center axis extending normal to the plane of the first and second planar surfaces and parallel to the elevation distance. The first and second patterns and the elevation distance are arranged such that when the patterns are viewed from a point on the common center axis, the image of the second pattern surrounds and is concentric with the image of first pattern which passes through the transparent member.

Another embodiment of the present invention comprises a first and a second of the omni-directional alignment structures of the first embodiment or of the second embodiment, the first structure arranged a distance to the left of a vertical center axis of a display screen and the second structure arranged the same distance to the right of the vertical axis, both being along a horizontal axis of the display.

BRIEF DESCRIPTION OF THE DRAWINGS

The foregoing and other objects, aspects, and advantages will be better understood from the following description of preferred embodiments of the invention with reference to the drawings, in which.

DETAILED DESCRIPTION OF THE EMBODIMENTS

Figure 1:
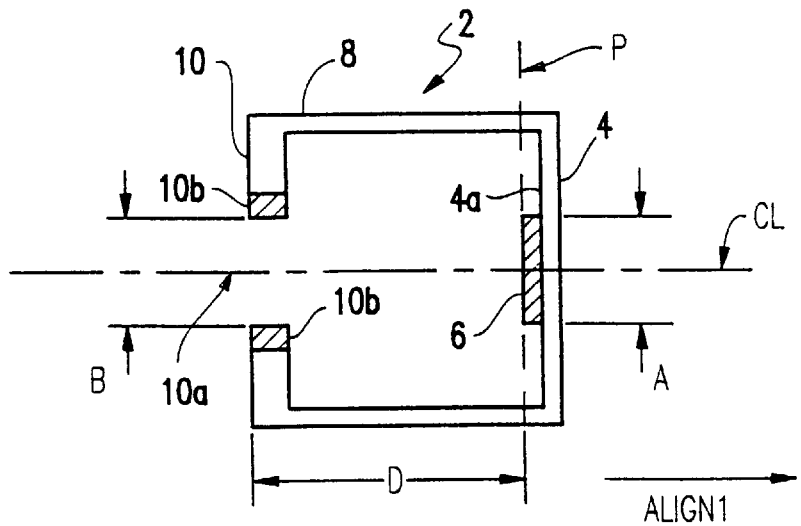
FIG. 1 is a cross-sectional side view of a first embodiment of an omni-directional alignment structure according to the present invention.

Referring to the drawings, and more particularly to FIG. 1, there is shown a cross-sectional side view of a first example embodiment of an omni-directional alignment structure 2 according to the present invention. The FIG. 1 embodiment comprises an inner pattern support 4 having an inner pattern 6 arranged parallel to a plane P with a diameter A thereon. An alignment axis extends from the center of the inner pattern 6 in a direction normal to the plane P.

The inner pattern 6 is shown, for this example, as a slightly raised structure but other structures and arrangements can be substituted. For example, a color pattern flush with or imbedded (not shown) in the support 4 could be used.

The inner pattern 6 is shown cross-hatched, representative of a contrasting color with respect to the surrounding area 4a of the inner pattern support 4. The specific color of both the inner pattern 6 and the surrounding area 4a is a design choice.

Extending in a direction normal from the plane P of the inner pattern support 4 is an axial spacer 8 which mounts an outer pattern support 10 at its distal end. The outer pattern support 10 is formed with a throughhole 10a with an outer pattern 10b surrounding the throughhole, both the throughhole 10a and the outer pattern 10b, having inner diameter B, centered on the axis CL. The outer pattern support 10 is arranged such that the outer pattern 10b is parallel to the plane P of the inner pattern and is spaced a distance D along the alignment axis away from the inner pattern 6. It is important that the inner pattern 6 and the outer pattern 10b are parallel, as will be further understood from the description below.

The outer pattern 10b is shown cross-hatched to represent a contrasting color with respect to surrounding surfaces, as was explained above for the inner pattern 6. However, the color of the inner and outer patterns 6 and 10b, with respect to the surrounding area, could be black on white, white on black, or any other contrasting color combination.

Figure 2A:
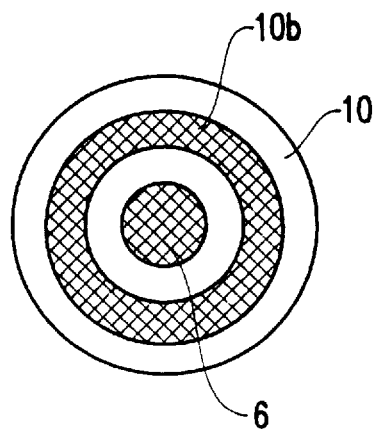
FIGS. 2A and 2B show the projection views that the user sees when the omni-directional alignment structure according to FIG. 1 is aligned and misaligned, respectively, according to the user's eye with respect to the center line CL.
Figure 2B:
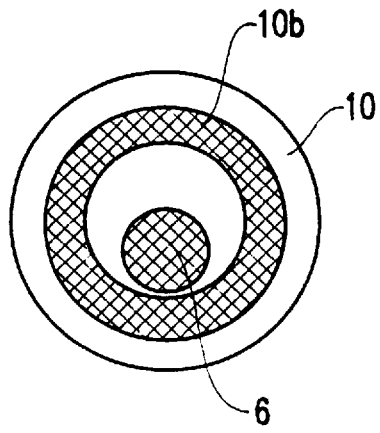

Referring to FIG. 2A, the diameters A and B, and distance D are set such that the user, when his/her eye is centered along the alignment axis CL in the direction ALIGN1 sees the outer pattern 10b concentric with the inner pattern 6. If the alignment structure 2 is displaced laterally in any direction in a plane perpendicular to the alignment axis CL, or if the alignment structure 2 is rotated such that, fixing CL, there is a non-zero angle formed by a line extending from the center of the inner pattern 6 to the center of the outer pattern 10b and CL, the user sees non-concentricity of the patterns 6 and 10b, as shown in FIG. 2B. The preferred ratio between the diameters A and B is approximately 2:1. The distance D adjusts the device sensitivity and limits the user's view angle of the alignment patterns 6 and 10b and, hence of the display. Accordingly, the distance D can be readily selected to keep the users', view angle within a specific tolerance. Based on a-priori knowledge of the view angle sensitivity of the LCD, the specific tolerance can be set to ensure that the user perceives a color within a given range of nominal.

Figure 3A:
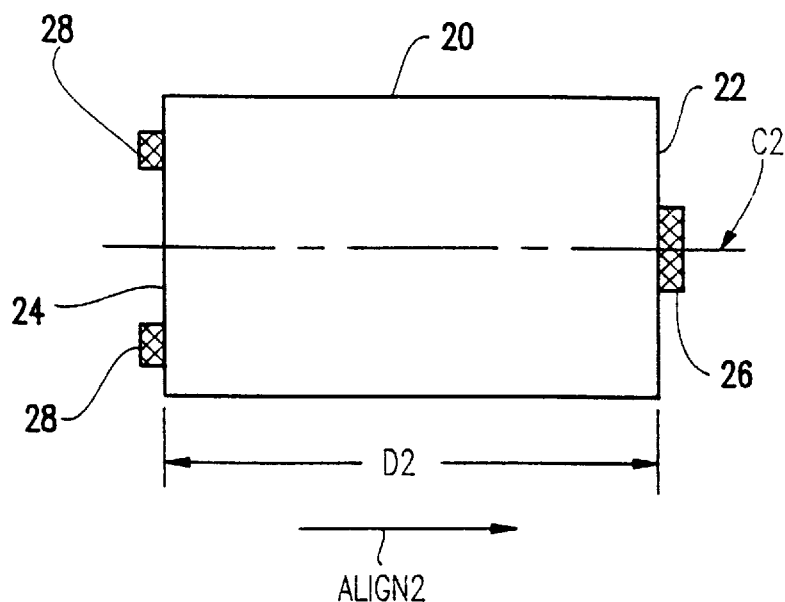
FIGS. 3A, 3B and 3C are a cross-sectional side view, a front view and a perspective view of an omni-directional alignment structure according to a second embodiment of the invention, having first and second patterns arranged on parallel surfaces of a transparent member.
Figure 3B:
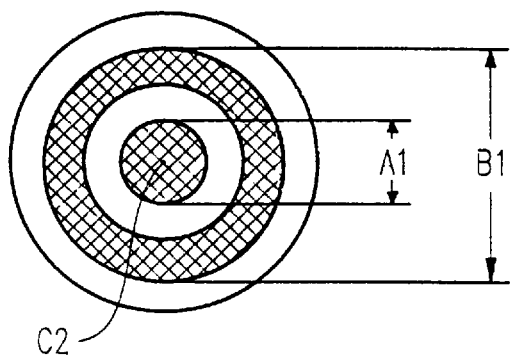
Figure 3C:
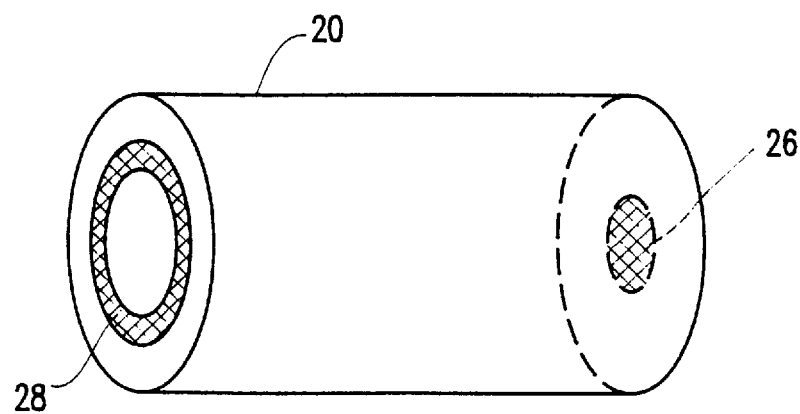

FIGS. 3A–3C show a second embodiment of an omnidirectional alignment structure according to the present invention. Referring to FIGS. 3A and 3B, this embodiment comprises an optically transparent member 20 having a first face 22 and a second face 24 which is parallel to and spaced apart a distance D2 from the first face. An first pattern 26 is formed on the first face, and a second pattern 28 is formed on the second face, each being centered about an alignment axis C2. The alignment axis is normal to the parallel planes of the first and second face. The first pattern has an outer diameter A1 and the second pattern has an inner diameter B1.

FIG. 3C is a projection of the first pattern 26 and the second pattern 28 viewed from a point along the alignment axis C2 in the direction ALIGN2, the first pattern 26 being within and concentric with the second pattern 28. To use the FIGS. 3A–3C structure it can be mounted on or in, by any of the various methods known in the art, an LCD housing or support such that the first and second patterns 26 and 28 are parallel to the display plane of the LCD and the alignment axis C2 is normal to the LCD's viewing angle. For similar reasons as for the FIG. 1 embodiment's dimensions of A and B, the preferred ratio between the diameters A1 and B1 is approximately 2:1. Also similar to the FIG. 1 embodiment, the distance D2 adjusts the device sensitivity and limits the user's view angle of the alignment patterns 26 and 28 and, hence of the display.

Referring to FIGS. 3A–3C, the first pattern 26 is shown smaller than the second pattern 28 for purposes of example only. An alternative (not shown) is to place the larger pattern 28 on the first face 22 and the smaller pattern 26 on the second face 24.

Figure 4:
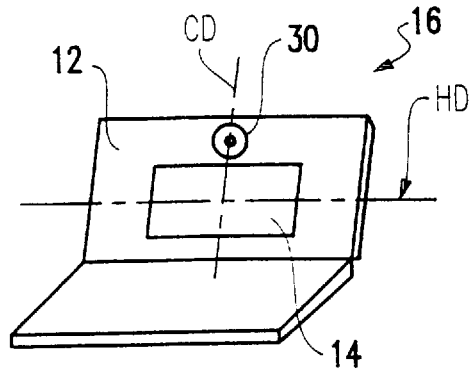
FIG. 4 shows in perspective view an example notebook computer having an omni-directional alignment structure according to FIG. 1 or FIGS. 3A–C.

FIG. 4 shows a further embodiment comprising an alignment structure 30, which is according to either of FIGS. 1 or 3A–3C, arranged on an LCD support 12 on a vertical center line CD of an LCD display 14 on the support 12. As shown, the LCD support 12 is attached to a conventional notebook type personal computer 16. The present inventor has constructed and tested a prototype according to FIG. 4, with the alignment structure 30 in accordance with the FIGS. 3A–3C embodiment. The prototype successfully demonstrated the invention being a convenient, accurate and user-friendly alignment apparatus.

Figure 5:
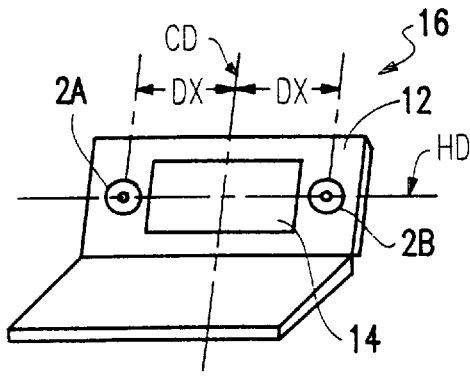
FIG. 5 shows in perspective view an example notebook computer having a first and a second omni-directional alignment structure according to FIG. 1 or FIGS. 3A–C.

FIG. 5 shows a still further embodiment comprising a first 2A and second 2B alignment structure, each being according to either of FIGS. 1 and 3A–3C, arranged on the LCD support 12 at a distance DX to either side of the vertical center line CD and along a horizontal center line HD of an LCD display 14 on the support 12. The distance DX is preferably one half the average human inter-ocular spacing to minimize parallax.

While the foregoing invention has been described with specific references to examples of its preferred embodiments, it should be understood that various substitutions, variations, and modifications may be made thereto without departing from the scope of the invention as defined in the appended claims. For example, referring to FIG. 1, the alignment structure 2 can be a separately formed unit mounted to the LCD support 12 by one of several techniques known to one of skill in the art, or can be formed at least partially integral to the LCD support 12. More specifically, the support 4 of the FIG. 1 embodiment may be a surface of the LCD support 12. Further, the alignment structure 2 can be arranged within a recess (not shown) in the LCD support 12 to avoid any protruding structure. Still further, referring to FIGS. 3A–3C, the first pattern 26 can formed on a surface of the LCD support 12, instead of on surface 22 of the member 20, and the member 20 mounted on that LCD surface such that the center axis C2 of the second pattern 28 passes through a center axis (not shown) of the first pattern 26 formed on the support, with patterns 26 and 28 being parallel.

Having thus described my invention, what I claim as new and desire to secure by Letters Patent is as follows:

1. A visual display alignment apparatus, comprising:

a pattern support;

first visual pattern arranged in a first plane on said pattern support, having a first perimeter having a first diameter, said first perimeter arranged in symmetrical alignment with a center point on said pattern support;

means for supporting a second pattern in a second plane a first distance in a first direction away from an upper surface of said first pattern, said second plane being substantially parallel to said first plane;

a second pattern formed in said second plane on said means for supporting a second pattern, said second pattern having a second perimeter having a second diameter, said second perimeter arranged in symmetrical alignment with an alignment axis normal to said display plane and passing through said center point, wherein said first diameter, said first distance, said second diameter and said means for supporting a second pattern are arranged such that a projection of said first pattern and said second pattern on a plane normal to said first direction spaced apart from outer pattern provides an image of a substantially concentrically aligned first perimeter of said first pattern and said second perimeter of said second pattern around said alignment axis.

2. A visual display alignment apparatus according to claim 1 wherein said means for supporting a second pattern includes a plate spaced above said pattern support, said plate having a throughole with a bore axis substantially collinear with said alignment axis.

3. A visual display alignment apparatus according to claim 1, wherein said means for supporting a second pattern a first distance in a first direction away from an upper surface of said first pattern comprises a spacer member, said spacer member being optically transparent in said first direction between said first visual pattern and said second visual pattern.

4. A visual display alignment apparatus according to claim 3, wherein said spacer member includes a first planar surface on which said second visual pattern is formed.

5. A visual display alignment apparatus according to claim 4, wherein said spacer member includes a second planar surface, and said second planar surface constitutes said pattern support.

6. An alignable visual display comprising:

a visual display, for displaying an image along a display plane, said image being symmetrically spaced with respect to a vertical center axis along said display plane and a horizontal center axis on said display plane, said visual display arranged on a display support;

a first omni-directional alignment apparatus including:

a first visual pattern, arranged parallel to said display plane on said display support, having a first perimeter having a first diameter, said first perimeter arranged in symmetrical alignment with a first center point on said inner pattern support;

means for supporting a second pattern a first distance in a first direction away from an upper surface of said first pattern, said first direction normal to said display plane;

a second pattern formed on said means for supporting a second pattern, said second pattern having a second perimeter having a second diameter, said second pattern being in a plane parallel to said display plane, and said second perimeter arranged in symmetrical alignment with a first alignment axis normal to said display plane and passing through said first center point, wherein said first diameter, said first distance, said second diameter and said means for supporting a second pattern are arranged such that a projection of said first pattern and said second pattern on a projection plane parallel to said display plane and spaced apart from said second pattern away from said first plane provides an image of said first perimeter substantially concentrically aligned, around said first alignment axis with an image of said second perimeter.

7. An alignable visual display according to claim 6 wherein said first center point is along said vertical axis of said visual display.

8. An alignable visual display according to claim 6 further comprising a second omni-directional alignment apparatus including:

a third visual pattern, arranged in a plane parallel to said display plane on said display support, having a third perimeter having said first diameter, said third perimeter arranged in symmetrical alignment with a second center point on said inner pattern support;

means for supporting a fourth pattern said first distance in said first direction away from an upper surface of said third pattern;

a fourth pattern formed on said means for supporting a fourth pattern, said fourth pattern having a fourth perimeter having a fourth diameter, and said fourth pattern being in a plane parallel to said display plane, and said fourth perimeter arranged in symmetrical alignment with a second alignment axis normal to said display plane and passing through said second center point wherein said third diameter, said fourth diameter and said means for supporting a fourth pattern are arranged such that a projection of said third pattern and said forth pattern on said projection plane provides an image of said third perimeter substantially concentrically aligned with an image of said fourth perimeter, and wherein said first center point and said second point are spaced apart equidistant about said vertical axis, whereby a user viewing said display from a plane of view parallel to said first plane and a point of view substantially center to said vertical and horizontal axes sees, simultaneously, an image of said first perimeter substantially concentrically aligned with an image of said second perimeter and an image of said third perimeter substantially concentrically aligned with an image of said fourth perimeter.

* * * * *